(12) United States Patent
Muthujumaraswathy et al.

(10) Patent No.: US 6,279,045 B1
(45) Date of Patent: Aug. 21, 2001

(54) MULTIMEDIA INTERFACE HAVING A MULTIMEDIA PROCESSOR AND A FIELD PROGRAMMABLE GATE ARRAY

(75) Inventors: Kumaraguru Muthujumaraswathy, Santa Clara; Michael D. Rostoker, Boulder Creek, both of CA (US)

(73) Assignee: Kawasaki Steel Corporation, Tokyo (JP)

( * ) Notice: Subject to any disclaimer, the term of this patent is extended or adjusted under 35 U.S.C. 154(b) by 0 days.

(21) Appl. No.: 09/166,499

(22) Filed: Oct. 5, 1998

Related U.S. Application Data
(60) Provisional application No. 60/068,851, filed on Dec. 29, 1997, and provisional application No. 60/068,852, filed on Dec. 29, 1997.

(51) Int. Cl.[7] .............................. G06F 3/00; G06F 15/00; G06F 15/76
(52) U.S. Cl. .................................. 710/5; 710/5; 712/11; 712/15; 712/16
(58) Field of Search .................................. 710/1, 5; 712/1, 712/10, 35, 39, 41, 30, 43, 11, 15, 16; 326/39, 38, 41

(56) References Cited

U.S. PATENT DOCUMENTS

| | | | |
|---|---|---|---|
| 4,734,856 | 3/1988 | Davis | 364/300 |
| 4,744,054 | 5/1988 | Kawata et al. | 365/104 |
| 5,361,373 | * 11/1994 | Gilson | 712/1 |
| 5,379,388 | 1/1995 | Asghar | 395/375 |
| 5,404,555 | 4/1995 | Liu | 395/800 |
| 5,479,166 | 12/1995 | Read et al. | 341/65 |
| 5,504,920 | 4/1996 | Biggs et al. | 395/800 |
| 5,511,211 | 4/1996 | Akao et al. | 395/800 |
| 5,512,896 | 4/1996 | Read et al. | 341/65 |
| 5,522,082 | 5/1996 | Guttag et al. | 395/800 |
| 5,537,601 | * 7/1996 | Kimura et al. | 712/35 |
| 5,577,213 | 11/1996 | Avery et al. | 395/280 |
| 5,588,152 | 12/1996 | Dapp et al. | 395/800 |
| 5,590,345 | 12/1996 | Barker et al. | 395/800 |
| 5,590,350 | 12/1996 | Guttag et al. | 395/800 |
| 5,600,845 | * 2/1997 | Gilson | 712/39 |
| 5,600,847 | 2/1997 | Guttag et al. | 395/800 |
| 5,603,012 | 2/1997 | Sotheran | 395/500 |
| 5,606,677 | 2/1997 | Balmer et al. | 395/384 |
| 5,625,836 | 4/1997 | Barker et al. | 395/800 |
| 5,644,522 | 7/1997 | Moyse et al. | 364/745.02 |
| 5,644,524 | 7/1997 | Van Aken et al. | 364/766 |
| 5,644,790 | 7/1997 | Li et al. | 395/883 |
| 5,680,339 | 10/1997 | Moyse et al. | 364/745 |
| 5,687,325 | * 11/1997 | Chang | 712/34 |
| 5,696,954 | 12/1997 | Guttag et al. | 395/562 |
| 5,696,956 | * 12/1997 | Razdan et al. | 712/23 |
| 5,696,959 | 12/1997 | Guttag et al. | 385/595 |
| 5,825,202 | * 10/1998 | Tavana et al. | 326/39 |
| 6,011,407 | * 1/2000 | New | 326/39 |
| 6,020,755 | * 2/2000 | Andrews et al. | 326/39 |

* cited by examiner

Primary Examiner—Thomas Lee
Assistant Examiner—Chun Cao
(74) Attorney, Agent, or Firm—Gerald E. Linden

(57) ABSTRACT

An integrated circuit architecture for multimedia processing. A single integrated circuit (IC) operates as a system or subsystem, and is adaptable to processing a variety of multimedia algorithms, whether proprietary or open. Hard macros, either analog or digital, can be incorporated. The IC can also contain audio/video CODECs to suit different standards, as well as other peripheral devices which may be required for multimedia applications. An electronic component (e.g., integrated circuit) incorporating the technique is suitably included in a system or subsystem having electrical functionality, such as general purpose computers, telecommunications devices, and the like.

22 Claims, 2 Drawing Sheets

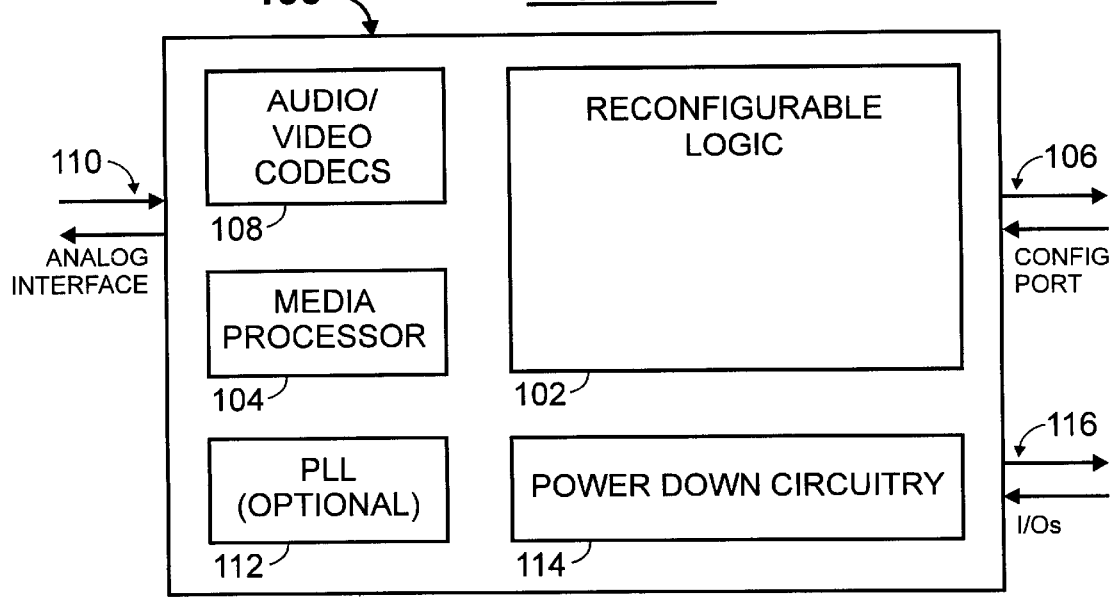
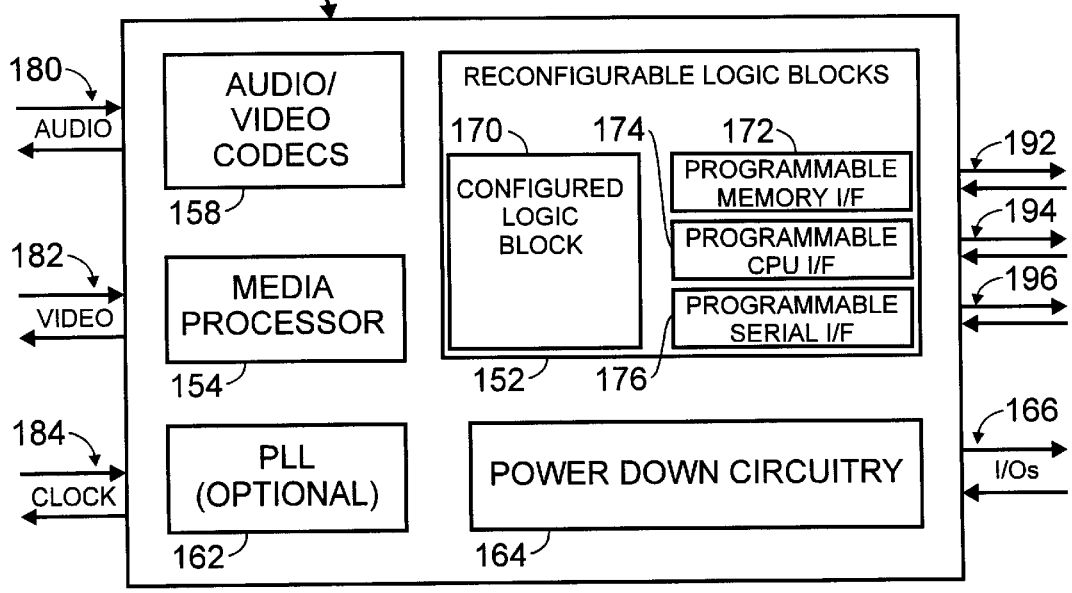

MULTIMEDIA INTERFACE HAVING A MULTIMEDIA PROCESSOR AND A FIELD PROGRAMMABLE GATE ARRAY

CROSS-REFERENCE(S) TO RELATED APPLICATION(S)

This application is a continuation-in-part of commonly-owned, copending U.S. patent application Ser. No. 60/068,851 filed Dec. 29, 1997, and of commonly-owned, copending U.S. patent application Ser. No. 60/068,852 filed Dec. 29, 1997, both of which are incorporated in their entirety by reference herein.

TECHNICAL FIELD OF THE INVENTION

The present invention relates broadly to signal processing and, more particularly, to interfacing with a variety of multimedia signals.

BACKGROUND OF THE INVENTION

Field programmable logic and in particular, field programmable gate arrays (FPGAs), have become the solution of choice for logic design implementation in applications where time to market is a critical product development factor. In addition, such reconfigurable arrays have been used to enhance customer product flexibility in ways that no other technology can currently match.

Microprocessors have traditionally been used to satisfy time to market and end product flexibility needs. This solution may not meet performance constraints and lacks the concurrency possible in an unconstrained hardware design. Typical design processes, therefore, reach a point where the overall design is partitioned into hardware and software components. An interface is defined and the design process continues along two parallel paths. Sometime later, the software and hardware components must be integrated. Problems usually develop at this point because of interface misinterpretation or partitioning that cannot meet design requirements. This impacts the hardware, the software and the schedule. If the hardware design is realized in programmable logic, the hardware can be manipulated as easily as the software.

Products which adapt to the end user's particular requirements, through self-directed or end user directed reconfiguration, are becoming more prevalent. As the number of modes of operation increases, mode-specific hardware becomes a less cost-effective solution. In the case where the end user is truly directing the adaptation, predetermined hardware solutions become unacceptable. Reconfigurable logic enables design solutions where dynamic hardware/software re-partitioning is possible.

Programmable logic not only vastly improves the time necessary to implement a static design, but significant time to market and product feature benefits can be realized when hardware can dynamically be altered as easily as software.

To reduce design cycles, designers have also turned towards high level design languages (e.g., HDL) and logic synthesis tools. Many programmable logic solutions are poorly suited to this design methodology, however. An incompatibility exists between logic synthesis algorithms originally developed for gate-level design and the block-like structures found on many programmable logic devices. This can result in significant under utilization or degraded performance. In either case a more expensive device is required. Real gate-level programmable devices are ideally suited to this design methodology.

When schematic-based design methods are used, some programmable logic solutions impose significant constraints on design implementation to ensure satisfactory results. This imposition tends to bind the design to a particular programmable device and requires a significant learning investment. Any design specification changes which impact design decisions made to fit this imposed structure can have disastrous effects on utilization and performance and can potentially require a more expensive device or even a costly redesign. Gate-level programmable devices, coupled with sophisticated, timing-driven, implementation tools, minimize device-specific optimization.

Any design process includes a significant amount of learning. Usually engineers spend most of this time learning about product requirements or prototyping critical portions of the design to prove implementation feasibility. Many programmable logic solutions are not "push button". Time must be spent learning programmable device architecture or implementation tool quirks. Worse yet, the design may require modification or manual component placement to meet design targets. This increases the cost and time to market.

The discipline of multimedia signal processing typifies the challenges discussed hereinabove. Various emerging and evolving multimedia standards continue to create substantial confusion in the design of appropriate IC (and systems incorporating ICs) architecture(s). The current "solutions" to these problems can broadly be characterized as:

dedicated multiple chipsets, along with some number of interface chips; and programmable engines, specific to a particular standard, along with some number of interface chips.

Each of these "solutions" requires multiple chips, and either a very expensive custom system/board combination of chips for each application or an inefficient use of multiple chips to meet a specific application. Hence, there is a need for a solution to facilitate multimedia system or subsystem design using a single IC chip which is adaptable (or readily configurable) to a variety of standards.

DISCUSSION OF THE PRIOR ART

The following documents, all of which are U.S. patents, all of which are incorporated by reference herein, disclose various techniques having some relevance to the present invention.

U. S. Pat. No. 5,696,959 (December 1997) discloses memory store from a selected one of a register pair conditional upon the state of a selected status bit.

U. S. Pat. No. 5,696,954 (December 1997) discloses three input arithmetic logic unit with shifting means at one input forming a sum/difference of two inputs logically ANDed with a third input logically ORed with the sum/difference logically ANDed with an inverse of the third input.

U.S. Pat. No. 5,680,339 (October 1997) discloses method and rounding using redundant coded multiply result. See also U.S. Pat. No. 5,644,522 (July 1997) which discloses method, apparatus and system for multiply rounding using redundant coded multiply result.

U.S. Pat. No. 5,644,790 (July 1997) discloses a universal CD ROM interface using single interface connection.

U.S. Pat. No. 5,644,524 (July 1997) discloses an iterative division apparatus, system and method employing left most one's detection and left most one's detection with exclusive OR.

U.S. Pat. No. 5,625,836 (April 1997) discloses SIMD/MIMD processing memory element (PME).

U.S. Pat. No. 5,606,677 (February 1997) discloses a packet word multiply operation forming output including most significant bits of product and other bits of one input.

U.S. Pat. No. 5,603,012 (February 1997) discloses a start code detector.

U.S. Pat. No. 5,600,847 (February 1997) discloses a three input arithmetic logic unit with mask generator. See also related U.S. Pat. No. 5,590,350 (December 1996).

U.S. Pat. No. 5,590,345 (December 1996) discloses an advanced parallel array processor (APAP). See also related U.S. Pat. No. 5,588,152 (December 1996) which discloses an advanced parallel processor including advanced support hardware.

U.S. Pat. No. 5,577,213 (November 1996) discloses a multi-level adaptor card for computer.

U.S. Pat. No. 5,522,082 (May 1996) discloses a graphics display processor, a graphics display system and method of processing graphics data with control signals connected to a central processing unit and graphics circuits.

U.S. Pat. No. 5,512,896 (April 1996) discloses a Huffman encoding method, circuit and system employing most significant bit change for size detection, U.S. Pat. No. 5,511,211 (April 1996) discloses a method for flexibly developing a data processing system comprising rewriting instructions in non-volatile memory elements after function check indicates failure of required functions.

U.S. Pat. No. 5,504,920 (April 1996) discloses a video driver system for communicating specific primitive commands to multiple video controller types.

U.S. Pat. No. 5,479,166 (December 1995) discloses a Huffman encoding method, circuit and system employing conditional subtraction for conversion of negative numbers.

U.S. Pat. No. 5,404,555 (April 1995) discloses a macro instruction set computer architecture.

U.S. Pat. No. 5,379,388 (January 1995) discloses digital signal processing apparatus with sequencer designating program routines.

U.S. Pat. No. 4,744,054 (May 1988) discloses a semiconductor device with a memory circuit.

Glossary

Unless otherwise noted, or as may be evident from the context of their usage, any terms, abbreviations, acronyms or scientific symbols and notations used herein are to be given their ordinary meaning in the technical discipline to which the invention most nearly pertains. The following terms, abbreviations and acronyms may be used in the description contained herein:

A/D: Analog-to-Digital (converter).
ALU: Arithmetic Logic Unit.
ASIC: Application-Specific Integrated Circuit.
bit: binary digit.
byte: eight contiguous bits.
CAM: Content-Addressable Memory.
CMOS: Complementary Metal-Oxide Semiconductor.
CODEC: Encoder/De-Coder. In hardware, a combination of A/D and D/A converters. In software, an algorithm pair.
CPU: Central Processing Unit.
D/A: Digital-to-Analog (converter).
DRAM: Dynamic Random Access Memory
DSP: Digital Signal Processing (or Processor)
EEPROM: Also E2PROM. An electrically-erasable EPROM.
EPROM: Erasable Programmable Read-Only Memory.
Flash: Also known as Flash ROM. A form of EPROM based upon conventional UV EPROM technology but which is provided with a mechanism for electrically pre-charging selected sections of the capacitive storage array, thereby effectively "erasing" all capacitive storage cells to a known state.
FPGA: Field-Programmable Gate Array
g: or (giga), 1,000,000,000
Gbyte: gigabyte(s).
GPIO: General Purpose Input/Output.
HDL: Hardware Description Language.
IC: Integrated Circuit.
I/O: Input/Output.
IEEE: Institute of Electrical and Electronics Engineers
JPEG: Joint Photographic Experts Group
k: (or kilo), 1000.
KHz: KiloHertz (1,000 cycles per second).
MAC: Media Access Control.
Mask ROM: A form of ROM where the information pattern is "masked" onto memory at the time of manufacture.
MCM: Multi-Chip Module.
memory: hardware that stores information (data).
M: (or mega), 1,000,000
MHz: MegaHertz (1,000,000 cycles per second).
MLT: Multi-Level Technology.
NVRAM: Non-volatile RAM.
PLL: Phase Locked Loop
PROM: Programmable Read-Only Memory.
PWM: Pulse Width Modulation.
PLD: Programmable Logic Device.
RAM: Random-Access Memory.
RISC: Reduced Instruction Set Computer (or Chip).
ROM: Read-Only Memory.
SIE: Serial Interface Engine.
software: Instructions for a computer or CPU.
SRAM: Static Random Access Memory.
UART: Universal Asynchronous Receiver/Transmitter.
USB: Universal Serial Bus.
UV EPROM: An EPROM. Data stored therein can be erased by exposure to Ultraviolet (UV) light.
VHDL: VHSIC (Very High Speed Integrated Circuit) HDL.

BRIEF DESCRIPTION (SUMMARY) OF THE INVENTION

An object of the present invention is to provide a multimedia subsystem capable of being adapted to multiple disparate multimedia standards.

Another object of the invention is to provide such a multimedia subsystem on a single IC chip.

According to the invention, a single integrated circuit (IC) chip has a block of user-programmable (reconfigurable) logic such as a field-programmable gate array (FPGA), and has a multimedia processor "core" (functional block). These two blocks are combined (integrated) on a single IC chip to provide an off-the-shelf, semi-customizable component for multimedia applications.

In addition to the processor core and reconfigurable logic blocks, one or more of the following additional cores may be also be integrated onto the IC:

audio and/or video CODECs for interfacing to external analog multimedia signals;

phase locked loop (PLL) circuitry to reduce skew within various blocks within the IC chip and to synchronize to off-chip clock circuitry;

a programmable, fast serial interface core;

a programmable CPU interface core;

a programmable memory interface (PMI) core; and power-down circuitry, in combination with one or more of these additional cores, to provide power and/or processing savings when a given one of the cores is not in use.

A benefit of incorporating at least a media processor and reconfigurable logic onto a single IC chip, according to the invention, is that it is the hardware itself that can be configured to accommodate disparate multimedia standards, rather than requiring instructions (software) to be fed to the processor. This has a marked advantage in speed and density, and power.

According to an aspect of the invention, specific multimedia standards can be incorporated in and accommodated by (e.g., implemented by the programmable logic of) the IC chip of the present invention, including, but not limited to JPEG, MJPEG, MPEG-1, MPEG-2 with various levels and profiles, as well as video conferencing standards such as H.263, as well as specific serial standards such as IEEE 1394 or USB.

An integrated circuit (IC) employing the techniques of the present invention may be included in a system or subsystem having electrical functionality. Example systems may include general purpose computers; telecommunications devices (i.e., phones, faxes, etc.); networks; consumer devices; audio and visual receiving, recording and display devices; vehicle; etc.. It is within the scope of the invention that such systems would benefit substantially from technique(s) of the present invention.

Other objects, features and advantages of the invention will become apparent in light of the following description thereof.

BRIEF DESCRIPTION OF THE DRAWINGS

Reference will be made in detail to preferred embodiments of the invention, examples of which are illustrated in the accompanying drawings. The drawings are intended to be illustrative, not limiting. Although the invention will be described in the context of these preferred embodiments, it should be understood that it is not intended to limit the spirit and scope of the invention to these particular embodiments. Certain elements in selected ones of the drawings are illustrated not-to-scale, for illustrative clarity. Often, similar elements throughout the drawings are referred to by similar references numerals. For example, the element 199 may be similar in many respects to the element 299 in another figure. Also, often, similar elements are referred to with similar numbers in a single drawing. For example, a plurality of elements 199 may be referred to as 199a, 199b, 199c, etc.

FIG. 1 is a block diagram of an embodiment of an integrated circuit (IC) chip suited to interfacing with a variety of multimedia signals, according to the invention.

FIG. 2 is a block diagram of a multimedia system incorporating the multimedia IC chip of FIG. 1, according to the invention.

DETAILED DESCRIPTION OF THE INVENTION

Figure 3:
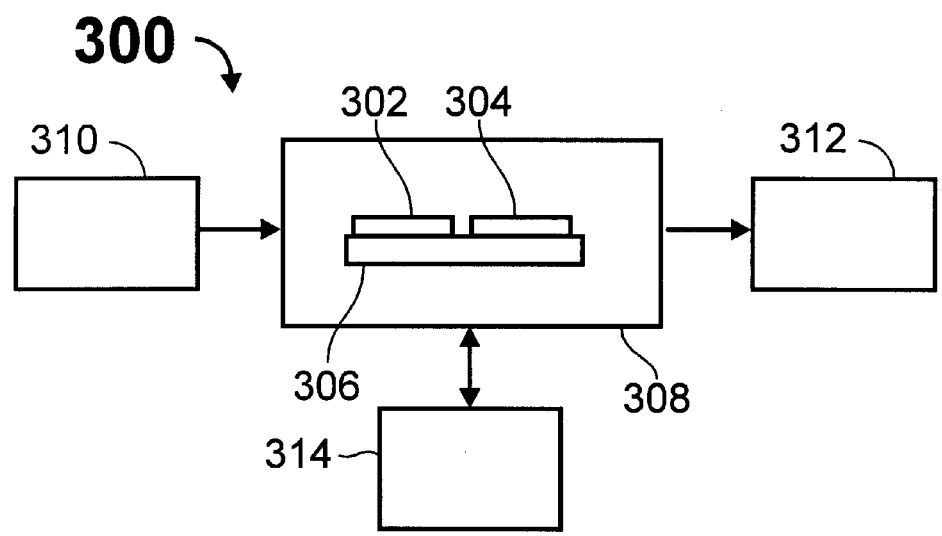
FIG. 3 is a schematic block diagram of a system incorporating the technique(s) of the present invention.

FIG. 1 illustrates an integrated circuit (IC) chip 100 for interfacing with a variety of multimedia signals having different standards. The IC chip 100 includes a block 102 of reconfigurable logic, such as a field programmable gate array (FPGA). The IC chip 100 also includes a media processor block 104. A configuration port (CONFIG PORT) 106 allows a user access to the reconfigurable logic 102 from off-chip (external to the chip).

The media processor block 104 is a functional block processor, such as the TM100, ULTRASPARC, or MPACT cores which can be implemented as a hard macro (or embedded array) with a virtual instruction set capable of implementing a variety of multimedia algorithms, whether proprietary or open. The media processor 104 can also be a full-featured microprocessor such as the ARM 7TDMI or 9TDMI. Or, the media processor can be selected from the MIPS R4000 family of processors, or a 32-bit RISC engine.

Typically, multimedia (e.g., audio and/or video) signals are provided in analog format. It is therefore useful to in corporate a functional block 108 of audio and/or video CODECs onto the IC chip 100. In this manner, the media processor 104 can communicate, via an analog interface 110, with off-chip multimedia signal sources and devices (not shown).

Typically, the CODECs 108 will be analog, but it is within the scope of this invention that digital or pseudo-digital CODECs may be used.

Phase Locked Loop (PLL) circuitry 112 may also be incorporated onto the IC chip 100 to reduce skew within various blocks (e.g., 102, 104, 108) within the IC chip 100 and to synchronize to off-chip clock circuitry (not shown) for high-speed serial data input. The skew reduction enabled by the PLL will alleviate long delays between the various chains in order to make the reconfigurable (e.g., FPGA) logic more useful.

Power Down Circuitry 114 may optionally be incorporated onto the IC chip 100 to provide power and/or processing savings when, for example, the CODEC 108 is not in use.

The IC chip 100 is also provided with an input/output (I/O) port 116 for interfacing with external devices.

Based on the description set forth hereinabove, one of ordinary skill in the art to which this invention most nearly pertains will understand that the functional blocks (102, 104, 108, 112, 114) on the IC chip 100 are interconnected with one another.

In this manner, a multimedia interface subsystem is provided, as a single IC chip (100) which is capable of being adapted to multiple, often disparate, multimedia standards.

FIG. 2 illustrates a multimedia system 150 incorporating the multimedia IC chip 100 of FIG. 1. The entire system 150 may similarly be incorporated on a single IC chip, or can be implemented in a multi-chip module (MCM).

The multimedia system 150 comprises a logic block 152 (described in greater detail hereinbelow), a media processor 154 (compare 104), CODECs 158 (compare 108), a phase locked loop (PLL) 162 (compare 112), and power down circuitry 164 (compare 114).

As in the previous example (100), the CODECs 158 will typically be analog, but it is within the scope of this invention that digital or pseudo-digital CODECs may be used. And the CODECs 158 and be audio, video, or both, communicating over lines 180 and 182, respectively, with external signal sources and destinations The logic block 152 (compare 102) is partitioned as follows:

A configured logic block 170 which contains a "least common denominator" set of instructions for operating the media processor 154 and managing communications between the following configurable (programmable) portions of the logic block.

A programmable memory interface (PMI) 172 allows the user to interface (via lines 192) with external memory such as Dynamic RAM (DRAM) or Synchronous DRAM, or Extended Data output DRAM. Typically, video applications demand non-standard size memories. This interface 172 communicates with off-chip memory and configures it virtually into what is optimal for a given application, and can communicate with different types of memory. For example, the external memory can be virtually configured so that one set of frame information can be split over one or more types (or chips) of memory. For example, for compressed data, the PMI 172 can direct primary points to be stored in one off-chip memory while directing vectors to be stored in another off-chip memory. Or, for mixed media, the audio portion can be stored in one off-chip memory and the video portion can be stored in another off-chip memory.

A programmable CPU interface 174 allows the user to interface (via lines 194) with CPUs which may either be on-chip (preferred) or off-chip. An example of a companion CPU chip is the X86 (Intel) family of CPUs.

A programmable serial interface 176 which allows the user to interface (via lines 196) to various serial interface standards such as USB, IEEE-1394 or other serial link.

Based on the description set forth hereinabove, one of ordinary skill in the art to which this invention most nearly pertains will understand that the functional blocks (152, 154, 158, 162, 164) of the system 150 are interconnected with one another.

Physical Implementation

There has been described, hereinabove, an integrated circuit (IC) chip 100 for interfacing with a variety of multimedia signals having different standards, the IC chip 100 including reconfigurable logic (e.g., FPGA) 102 and a media processor 104.

The IC chip 100 is readily designed using a variety of available design tools (e.g., HDL, VHDL) and is readily manufactured using conventional semiconductor processing techniques. Designs may be modeled and validated, prior to manufacturing a device, using any of a number of simulation tools, such as SPICE. And a number of "floorplanning" tools are available to optimize the layout of circuits and functional blocks on the IC chip.

Modern semiconductor devices generally (typically) comprise hundreds of thousands (and sometimes millions) of "gates" which are the primitive "building blocks" for complex devices. Thousands or tens of thousands of gates may be interconnected to form a single functional block such as the various functional blocks described hereinabove (media processor, reconfigurable logic, etc.).

In an embodiment of the invention, a block of reconfigurable logic (FPGA) is combined with a processor on a single IC chip. Previous integrated circuit designs, such as for the X86 (Intel) family of microprocessors have dedicated (required) a relatively large number of gates to the processor and a relatively few number of gates to on-chip memory. The requirements of the present invention are in marked contrast thereto.

Given the particular application for which the IC chip 100 of the present invention is targeted, it is contemplated that the relatively simple embedded processor (104) will "consume" only in the range of 20 k–40 k gates. And it is specifically intended that the reconfigurable logic (102) will be relatively large to accommodate the intended application flexibility, consuming at least 60 k gates, including at least 80k gates, including at least 100 k gates. In other words, considering 20k (twenty thousand) gates to be a "unit":

the processor (104) will require 1–2 units of gates; and the reconfigurable logic (102) will require at least 3 units of gates, including at least 4 units of gates, including at least 5 units of gates.

Therefore, the following ratio (L:P) of reconfigurable logic (L) gates to processor (P) gates are evident:

L:P=>3:1, >4:1, >5:1

Similarly, it is contemplated that an audio/video CODEC block (108) will use approximately 10 k ("C", one-half "unit") gates, and the following ratios are evident.

L:C=>6:1, >8:1, >10:1

P:C=between 2:1 and 4:1

System Integration

It is clearly contemplated that the technique(s) of the present invention, as disclosed hereinabove, can be integrated with other electronic components and subsystems to realize a subsystem or a system having electrical functionality such as, but not limited to: general-purpose computers; telecommunication devices (e.g., phones, faxes, etc); networks; consumer devices; audio and visual (video) receiving, recording and display devices and systems; and vehicles such as planes, trains and automobiles.

FIG. 3 illustrates an example of such an overall system 300. As shown therein, an electronic component 302 incorporating the technique(s) of the present invention can be connected, along with at least one other electronic component 304, on an interconnection substrate (e.g., motherboard) 306, thereby forming a subsystem 308, to which a number of peripheral (e.g., external) devices may be connected. Exemplary peripheral devices may include:

one or more devices 310 for providing inputs to the subsystem 308, such as keyboards, pointing devices, digitizing tablets, and the like;

one or more devices 312 for receiving outputs from the subsystem 308, such as video monitors, and the like; and one or more devices 314 for engaging in two-way communications with the subsystem 308, such as modems, printers, and the like.

It is clearly within the purview of a person having ordinary skill in the art to which the present invention most nearly pertains to effect such system integration, based on the descriptions set forth hereinabove.

Figure 3A:
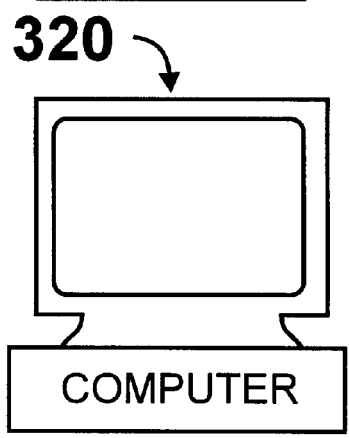
FIG. 3A is an illustration of a general purpose computer incorporating the technique(s) of the present invention.

FIG. 3A illustrates, for example, a general purpose computer 320 (compare 300) incorporating the present invention.

Figure 3B:
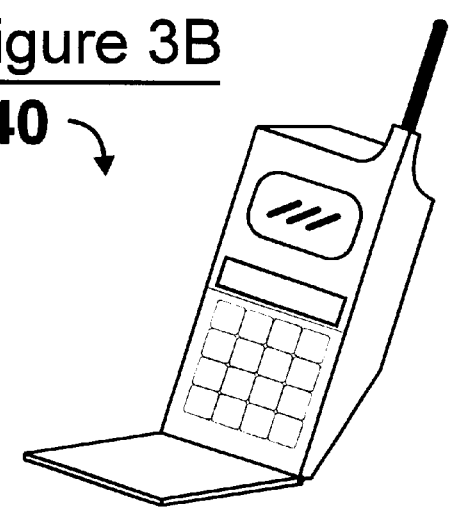
FIG. 3B is an illustration of a wireless telephone (cell phone) incorporating the technique(s) of the present invention.

FIG. 3B illustrates, for example, a wireless telephone 340 (compare 300) incorporating the present invention.

Although the invention has been illustrated and described in detail in the drawings and foregoing description, the same is to be considered as illustrative and not restrictive in character—it being understood that only preferred embodiments have been shown and described, and that all changes and modifications that come within the spirit of the invention are desired to be protected. Undoubtedly, many other "variations" on the "themes" set forth hereinabove will occur to one having ordinary skill in the art to which the present invention most nearly pertains, and such variations are intended to be within the scope of the invention, as disclosed herein.

For example, the signal processing interface of the present invention can combine re-configurable logic (e.g., FPGA) and a RISC core on a single IC chip.

For example, the signal processing interface of the present invention can combine re-configurable logic (e.g., FPGA) and a CODEC on a single IC chip.

For example, the signal processing interface of the present invention can combine re-configurable logic (e.g., FPGA) and a serial link on a single IC chip.

For example, Flash memory can be incorporated onto the chip, and can be used to upload/upgrade the firmware for the media processor (104, 154).

For example, the programmable logic can be used to implement a HW Java-Engine, which acts as a preprocessor/parser to the Media Processor, to crunch Java code, such as MPEG-4 Programming language.

What is claimed is:

1. Multimedia interface, comprising:

an integrated circuit (IC) chip;

a block of reconfigurable logic incorporated on the IC chip; and a multimedia processor block incorporated on the IC chip separately from the reconfigurable logic;

further comprising at least one functional block selected from the group consisting of:

audio and/or video CODECs for interfacing to external analog multimedia signals;

phase locked loop (PLL) circuitry to reduce skew within various blocks within the IC chip and to synchronize to off-chip clock circuitry;

a programmable, fast serial interface core;

a programmable CPU interface core;

a programmable memory interface (PMI) core; and power-down circuitry, in combination with one or more of these additional cores.

2. Multimedia interface, according to claim 1, wherein: the reconfigurable logic is a field programmable gate array (FPGA).

3. Multimedia interface, according to claim 1, wherein: the multimedia processor block is implemented with 20 k–40 k gates; and the reconfigurable logic block is implemented with at least 60 k gates.

4. Multimedia interface, according to claim 1, wherein: the at least one functional block is the CODECs; and the CODECs is implemented with approximately 10 k gates.

5. Multimedia interface, according to claim 1, wherein: the multimedia processor block is implemented with a first number (P) of gates; and the reconfigurable logic block is implemented with a second number (L) of gates; wherein:

the second number (L) is at least three times greater than the first number (P).

6. Multimedia interface, according to claim 5, wherein: the at least one functional block is the CODECs; and the CODECs is implemented with a third number (C) of gates; and the second number (L) is at least six times greater than the third number (C).

7. Multimedia interface, according to claim 5, wherein: the at least one functional block is the CODECs; and the CODECs is implemented with a third number (C) of gates; and the first number (P) is 2–4 times greater than the third number (C).

8. Multimedia interface, according to claim 1, wherein: the multimedia processor block is implemented with a first number (P) of gates; and the reconfigurable logic block is implemented with a second number (L) of gates; wherein:

the second number (L) is at least four times greater than the first number (P).

9. Multimedia interface, according to claim 8, wherein: the at least one functional block is the CODECs; and the CODECs is implemented with a third number (C) of gates; and the second number (L) is at least six times greater than the third number (C).

10. Multimedia interface, according to claim 8, wherein: the at least one functional block is the CODECs; and the CODECs is implemented with a third number (C) of gates; and the first number (P) is 2–4 times greater than the third number (C).

11. Multimedia interface, according to claim 1, wherein: the multimedia processor block is implemented with a first number (P) of gates; and the reconfigurable logic block is implemented with a second number (L) of gates; wherein:

the second number (L) is at least five times greater than the first number (P).

12. Multimedia interface, according to claim 11, wherein: the at least one functional block is the CODECs; and the CODECs is implemented with a third number (C) of gates; and the second number (L) is at least six times greater than the third number (C).

13. Multimedia interface, according to claim 11, wherein: the at least one functional block is the CODECs; and the CODECs is implemented with a third number (C) of gates; and the first number (P) is 2–4 times greater than the third number (C).

14. Multimedia interface, according to claim 1, wherein: the multimedia processor block is non-reconfigurable.

15. Multimedia interface, according to claim 1, wherein the multimedia processor block is incorporated as a hard macro.

16. Signal processing interface, comprising:

an integrated circuit (IC) chip;

a block of reconfigurable logic incorporated on the IC chip; and a RISC core incorporated on the IC chip separately from the reconfigurable logic;

further comprising at least one functional block selected from the group consisting of:

audio and/or video CODECs for interfacing to external analog multimedia signals;

phase locked loop (PLL) circuitry to reduce skew within various blocks within the IC chip and to synchronize to off-chip clock circuitry;

a programmable, fast serial interface core;

a programmable CPU interface core;

a programmable memory interface (PMI) core; and power-down circuitry, in combination with one or more of these additional cores.

17. Signal processing interface, according to claim 16, wherein:

the RISC core is non-reconfigurable.

18. An electronic system incorporating at least one integrated circuit (IC) chip, said IC chip comprising:

a block of reconfigurable logic incorporated on the IC chip; and a multimedia processor block incorporated on the IC chip separately from the reconfigurable logic;

further comprising at least one functional block selected from the group consisting of:

audio and/or video CODECs for interfacing to external analog multimedia signals;

phase locked loop (PLL) circuitry to reduce skew within various blocks within the IC chip and to synchronize to off-chip clock circuitry;

a programmable, fast serial interface core;

a programmable CPU interface core;

a programmable memory interface (PMI) core; and power-down circuitry, in combination with one or more of these additional cores.

19. An electronic system, according to claim 18, wherein the electronic system is selected from the group consisting of general-purpose computer, telecommunication device, network device, consumer device, receiver, recorder, display device, and vehicle.

20. An electronic system, according to claim 18, wherein:

the multimedia processor block is non-reconfigurable.

21. Multimedia interface, comprising:

an integrated circuit (IC) chip;

a block of reconfigurable logic incorporated on the IC chip;

a multimedia processor hard macro incorporated on the IC chip; and further comprising at least one functional block selected from the group consisting of:

audio and/or video CODECs for interfacing to external analog multimedia signals;

phase locked loop (PLL) circuitry to reduce skew within various blocks within the IC chip and to synchronize to off-chip clock circuitry;

a programmable, fast serial interface core;

a programmable CPU interface core;

a programmable memory interface (PMI) core; and power-down circuitry, in combination with one or more of these additional cores.

22. Multimedia interface, according to claim 21, wherein:

the reconfigurable logic is a field programmable gate array (FPGA).

\* \* \* \* \*